US010072383B1

(12) United States Patent
Stiles

(10) Patent No.: US 10,072,383 B1
(45) Date of Patent: Sep. 11, 2018

(54) INTERLOCKING TRAFFIC TILE FOR ONE PIECE WATER PERMEABLE PAVER

(71) Applicant: STILES MANUFACTURING, LLC, Houston, TX (US)

(72) Inventor: Barry J. Stiles, Houston, TX (US)

(73) Assignee: Stiles Manufacturing, LLC, Houston, TX (US)

( * ) Notice: Subject to any disclaimer, the term of this patent is extended or adjusted under 35 U.S.C. 154(b) by 34 days.

(21) Appl. No.: 15/360,244

(22) Filed: Nov. 23, 2016

Related U.S. Application Data

(63) Continuation-in-part of application No. 15/255,853, filed on Sep. 2, 2016, now Pat. No. 9,617,698.

(60) Provisional application No. 62/272,261, filed on Dec. 29, 2015.

(51) Int. Cl.
*E01C 5/00* (2006.01)
*E01C 9/00* (2006.01)
*E01C 5/20* (2006.01)

(52) U.S. Cl.
CPC .............. *E01C 5/00* (2013.01); *E01C 5/20* (2013.01); *E01C 9/004* (2013.01); *E01C 2201/10* (2013.01); *E01C 2201/12* (2013.01); *E01C 2201/18* (2013.01)

(58) Field of Classification Search
CPC ........ E01C 9/004; E01C 5/20; E01C 2201/10; E01C 2201/12; E01C 2201/18
See application file for complete search history.

(56) References Cited

U.S. PATENT DOCUMENTS

| 3,310,906 | A | | 3/1967 | Glukes | |
|---|---|---|---|---|---|
| 4,111,585 | A | | 9/1978 | Mascaro | |
| 4,440,818 | A | | 4/1984 | Buchan et al. | |
| 4,749,302 | A | | 6/1988 | DeClute | |
| 5,250,340 | A | * | 10/1993 | Bohnhoff | E01C 9/004 428/99 |
| 5,406,745 | A | | 4/1995 | Lin | |
| 5,411,782 | A | * | 5/1995 | Jarvis | E04H 4/08 160/229.1 |
| 5,848,856 | A | | 12/1998 | Bohnhoff | |
| 6,451,400 | B1 | | 9/2002 | Brock et al. | |
| 6,622,440 | B2 | | 9/2003 | Mercade | |
| 7,114,298 | B2 | | 10/2006 | Kotler | |
| 7,210,538 | B2 | | 5/2007 | Gust et al. | |

(Continued)

FOREIGN PATENT DOCUMENTS

JP 11061718 A * 3/1999 ............ E01C 5/20

*Primary Examiner* — Abigail Anne Risic
(74) *Attorney, Agent, or Firm* — Buskop Law Group, P.C.; Wendy Buskop

(57) ABSTRACT

An interlocking traffic tile for a one piece water permeable paver, which has a plurality of connection cells and is configured to support traffic, includes a paver plate with a top side formed over a plurality of intersecting beams. The paver plate has at least one of: a plurality of grooves extending into the top side of the paver plate, a plurality of ribs extending through the top side of the paver plate, and a plurality of perforations extending from the top side of the paver plate. The paver plate has at least one integral interlocking support integrally extending from the plurality of intersecting beams for locking to a connection cell of the one piece water permeable paver. The at least one integral interlocking support has a body, which connects the paver plate to the connection cell of the one piece water permeable paver.

17 Claims, 14 Drawing Sheets

(56) References Cited

U.S. PATENT DOCUMENTS

| | | | |
|---|---|---|---|
| 7,210,876 B2 | 5/2007 | Moralez et al. | |
| 7,571,572 B2 | 8/2009 | Moller | |
| 7,698,859 B2* | 4/2010 | Sansano Marti | E04F 15/02183 52/177 |
| 7,815,395 B1 | 10/2010 | Blackwood | |
| 7,950,191 B2 | 5/2011 | Brouwers | |
| 8,464,490 B2* | 6/2013 | Rapaz | E04C 2/20 52/592.1 |
| 8,683,769 B2* | 4/2014 | Cerny | E01C 5/001 404/36 |
| 8,734,049 B1 | 5/2014 | Stiles | |
| 9,540,811 B2* | 1/2017 | Rapaz | E04C 2/34 |
| 9,670,624 B1* | 6/2017 | Stiles | E01F 9/553 |
| 2003/0084626 A1* | 5/2003 | Hsieh | E04F 15/02411 52/220.1 |
| 2005/0193669 A1* | 9/2005 | Jenkins | E01C 5/20 52/392 |
| 2008/0052986 A1* | 3/2008 | Son | A63C 19/04 47/31.1 |
| 2008/0098685 A1* | 5/2008 | Polk | E01C 5/005 52/586.1 |
| 2008/0276567 A1* | 11/2008 | Rapaz | E04C 2/20 52/792.11 |
| 2009/0031658 A1* | 2/2009 | Moller, Jr. | E01C 5/20 52/403.1 |
| 2009/0235605 A1* | 9/2009 | Haney | E01C 5/20 52/588.1 |
| 2009/0313915 A1* | 12/2009 | Kellner | E04C 2/22 52/105 |
| 2012/0110933 A1* | 5/2012 | Beretta | E01C 5/20 52/177 |
| 2012/0163911 A1 | 6/2012 | Culleton et al. | |
| 2013/0276399 A1* | 10/2013 | Rapaz | E04C 2/34 52/592.1 |
| 2014/0186573 A1* | 7/2014 | Tubbs | B32B 7/08 428/99 |
| 2017/0252256 A1* | 9/2017 | Henshue | A61H 3/061 |
| 2018/0014994 A1* | 1/2018 | Henshue | E01C 5/16 |
| 2018/0028394 A1* | 2/2018 | Henshue | E01C 5/16 |
| 2018/0030666 A1* | 2/2018 | Penland, Jr. | E01C 9/086 |
| 2018/0030667 A1* | 2/2018 | Penland, Jr. | E01C 9/086 |

* cited by examiner

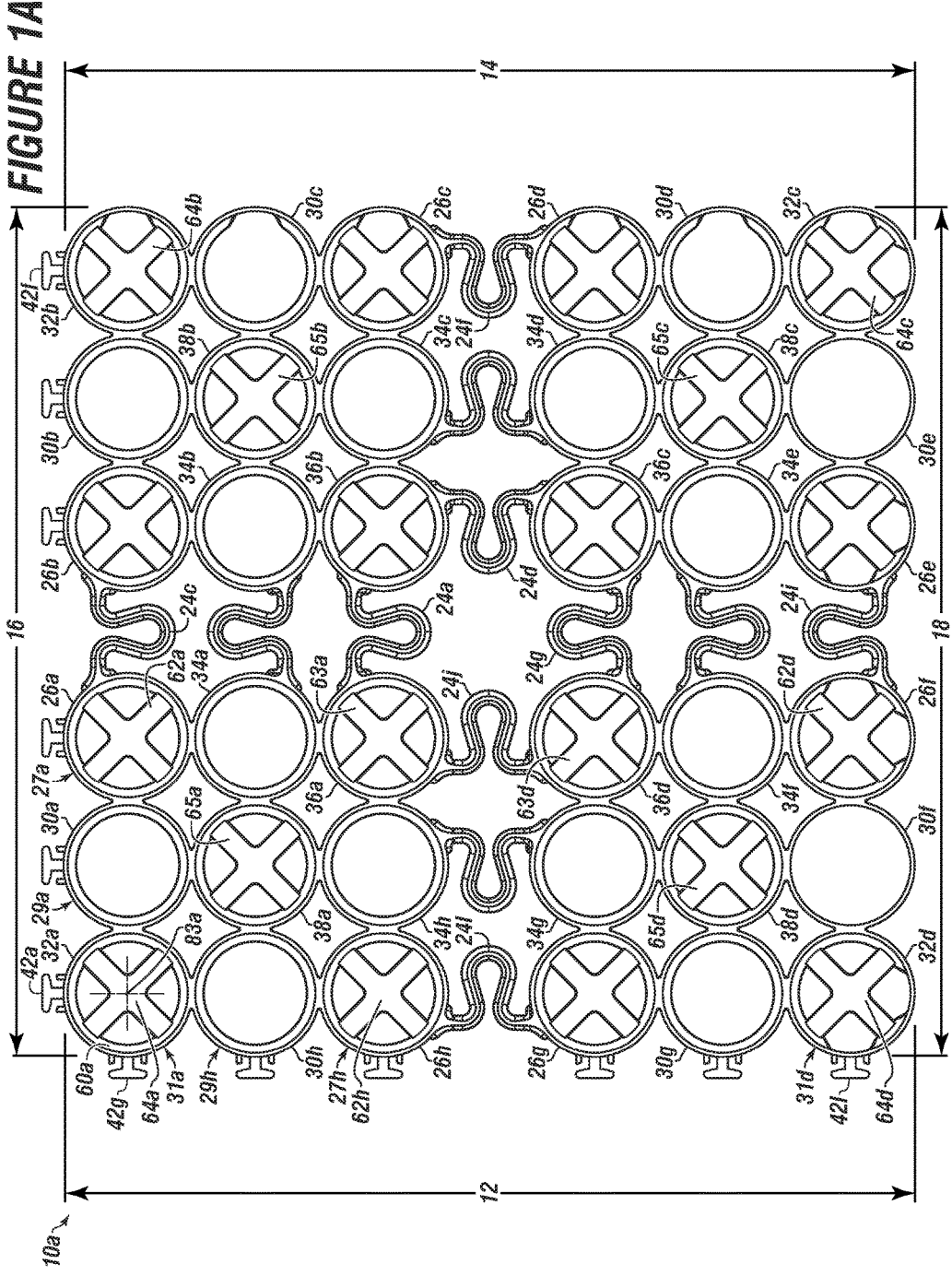

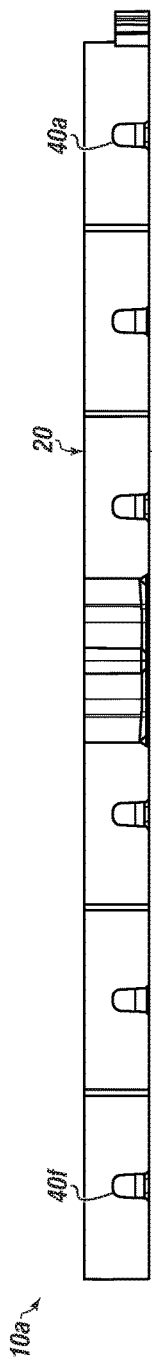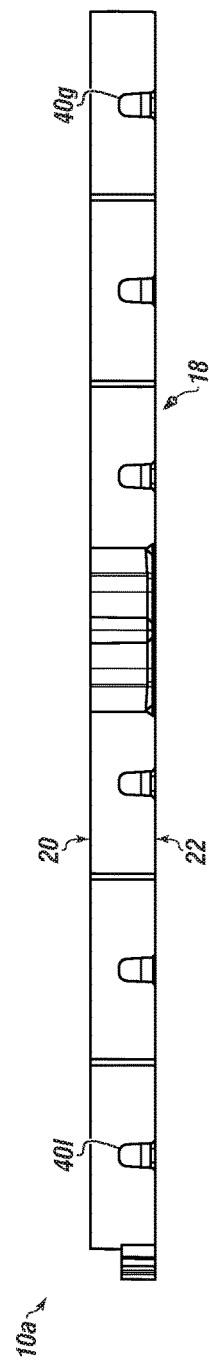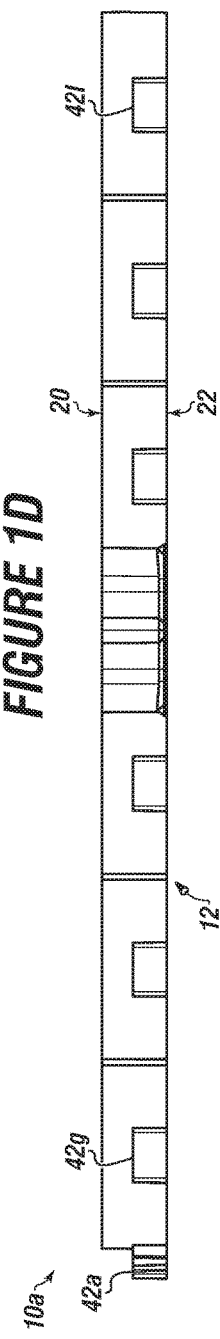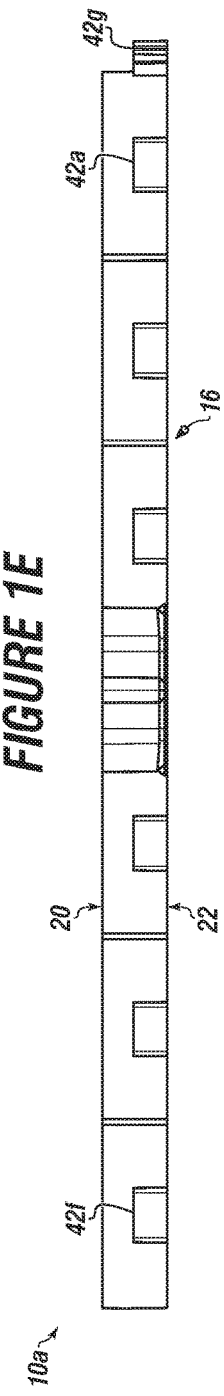

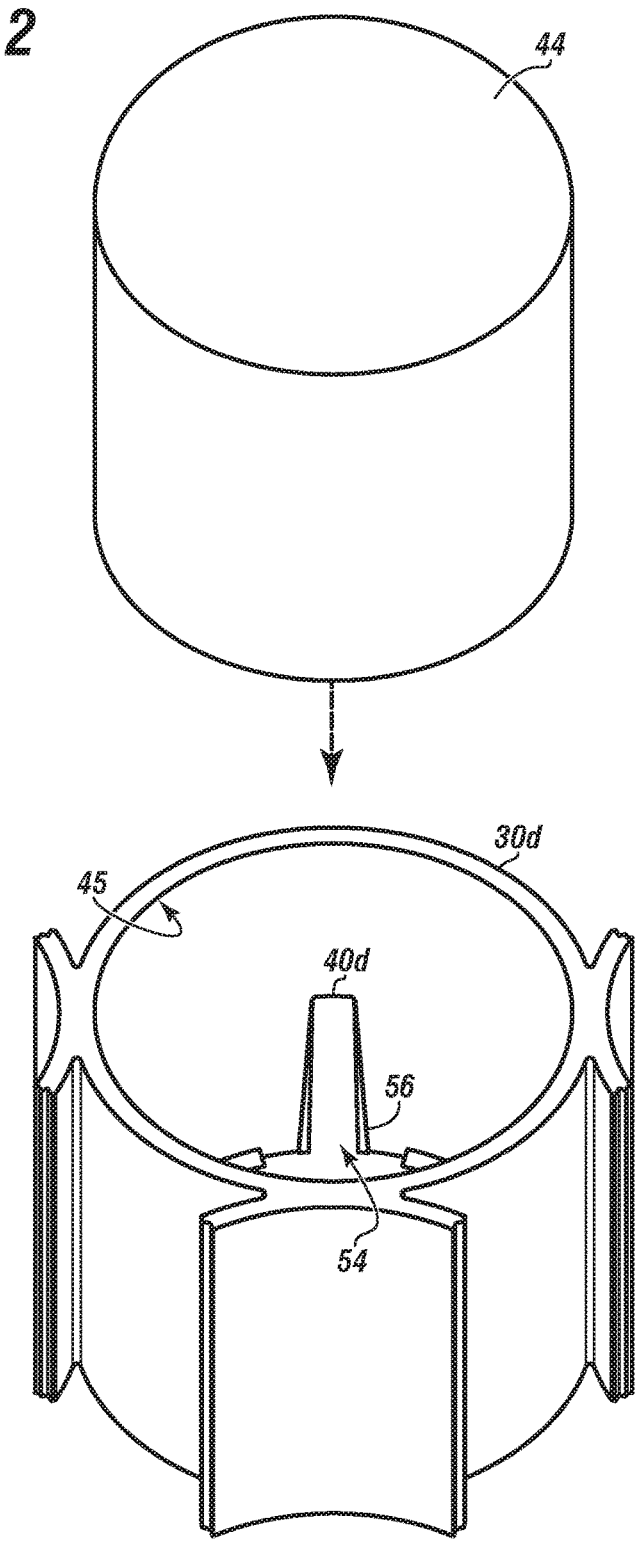

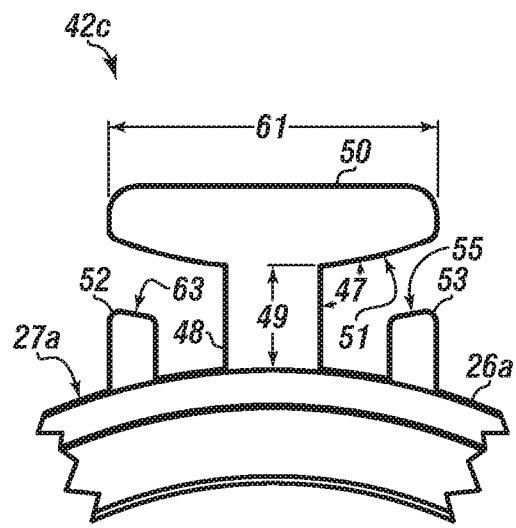
FIGURE 3
FIGURE 4
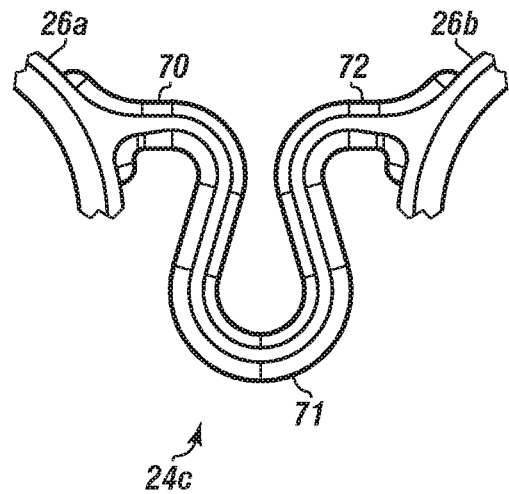

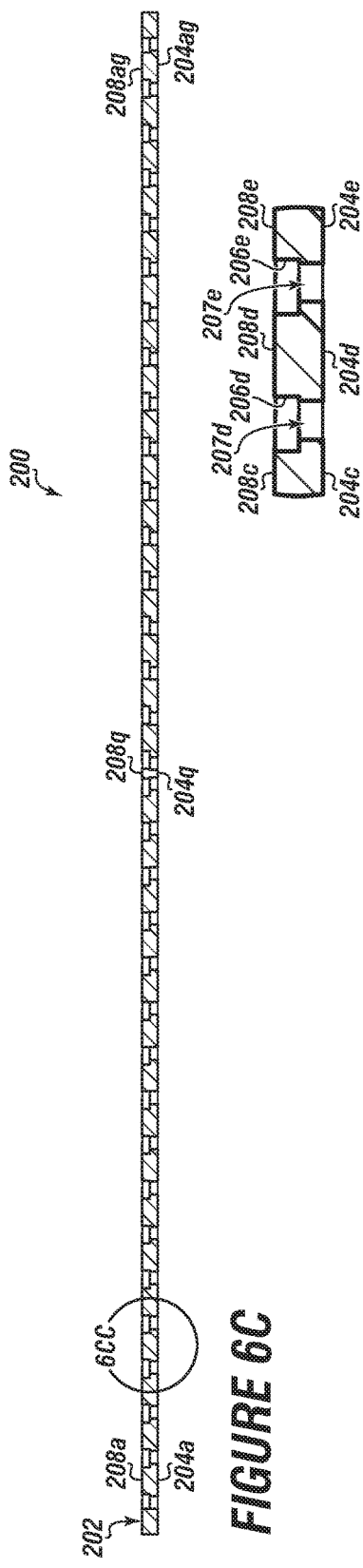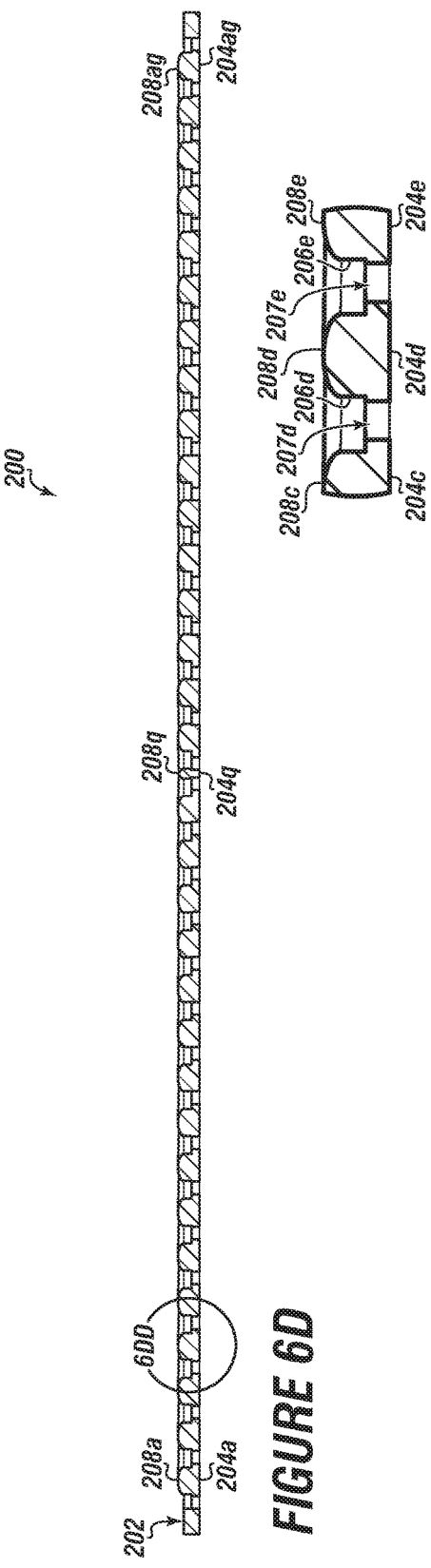

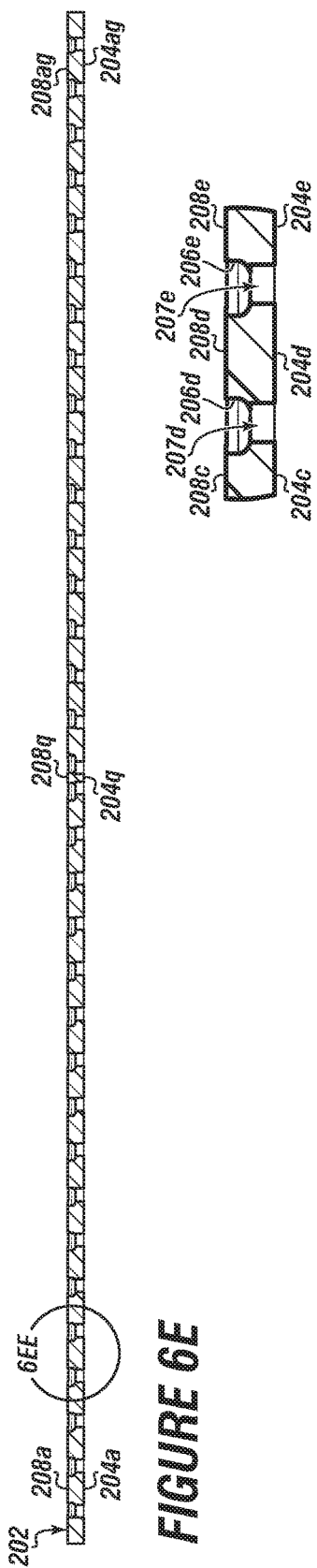

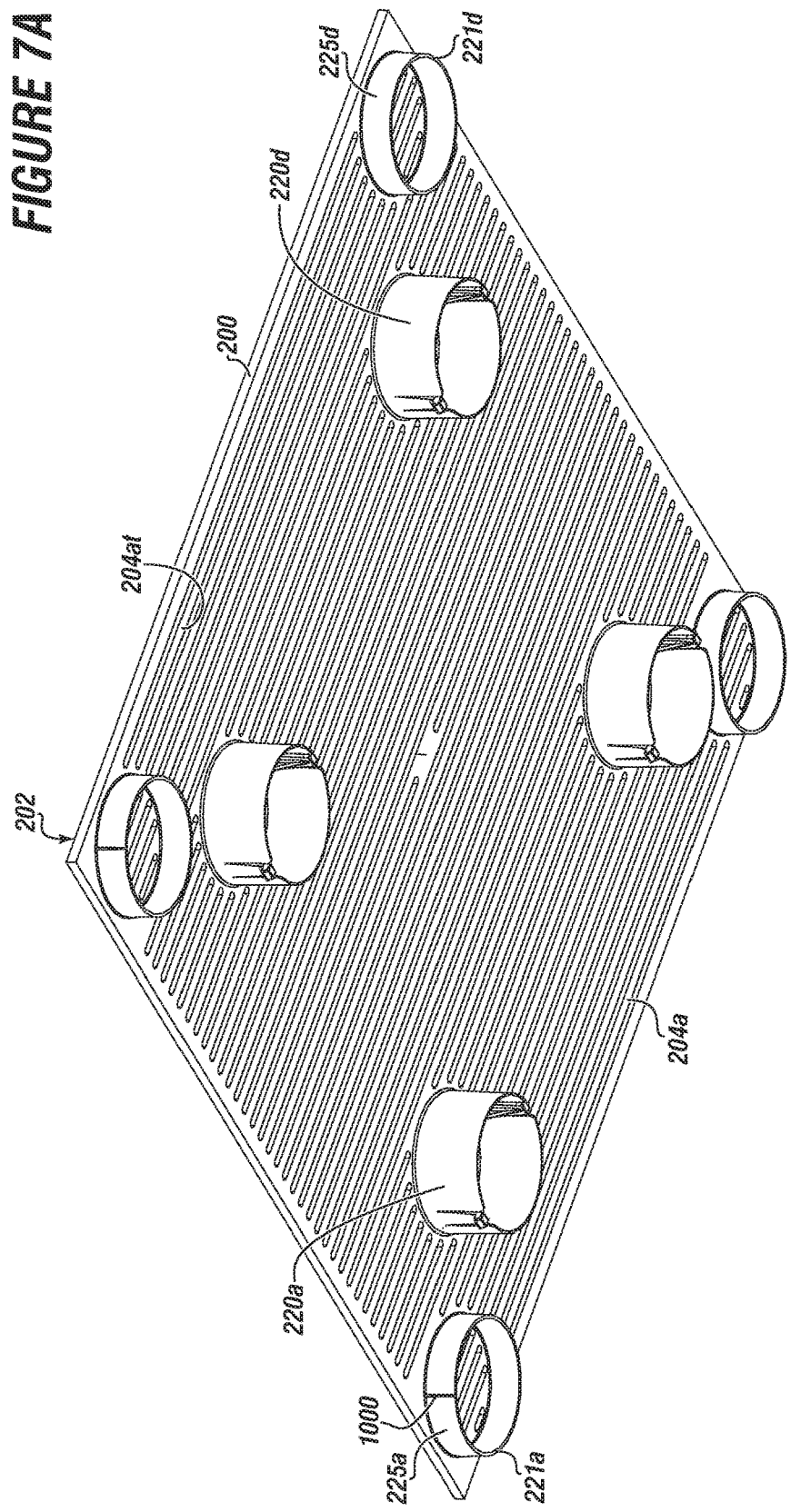

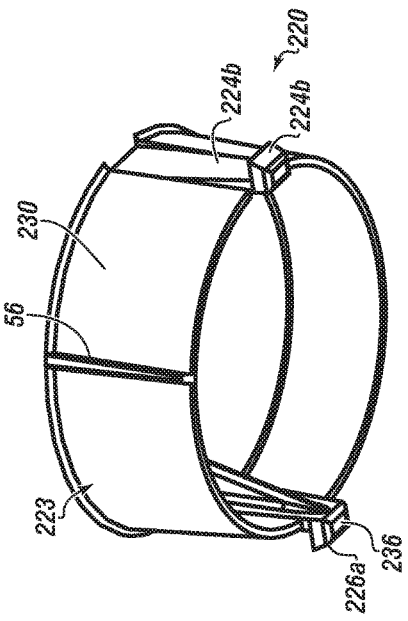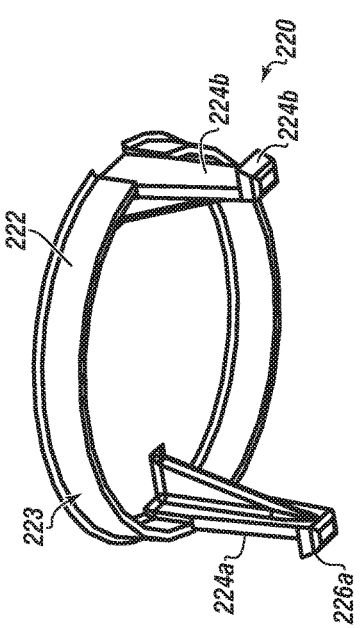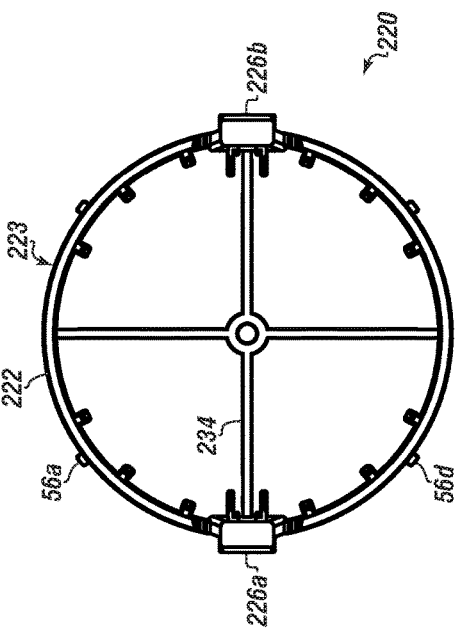

US 10,072,383 B1

INTERLOCKING TRAFFIC TILE FOR ONE PIECE WATER PERMEABLE PAVER

CROSS REFERENCE TO RELATED APPLICATIONS

The current application is a continuation-in-part of co-pending U.S. Non-Provisional patent application Ser. No. 15/255,853, filed Sep. 2, 2016, which claims priority to and the benefit under 35 U.S.C. § 119(e) of U.S. Provisional Patent Application Ser. No. 62/272,261, filed on Dec. 29, 2015. The disclosure of each application is hereby incorporated herein by reference in its entirety for all purposes.

FIELD

The present embodiments generally relate to a one piece water permeable paver forming a surface for traffic, such as a parking lot, a roadway, a golf cart path, a trail, a temporary roadway, a bicycle path, a jogging trail, a greenway space, a freight yard, a fire lane, a sidewalk, or another area where it is desirable for water to flow through rather than around a surface.

BACKGROUND

A need exists for a one piece water permeable paver that allows traffic and parking surfaces to be formed that enables grass to grow through the surface or contains aggregate, such as gravel, which allows water to permeate through the traffic and parking surface.

A need also exists for a one piece water permeable paver that can be a one piece molded unit created from recycled plastics, such as recycled milk bottles.

The present embodiments meet these needs.

BRIEF DESCRIPTION OF THE DRAWINGS

The detailed description will be better understood in conjunction with the accompanying drawings as follows:

FIG. 1A depicts a top view of a one piece water permeable paver according to one or more embodiments.

FIG. 1B depicts a side view of a second side of the one piece water permeable paver according to one or more embodiments.

FIG. 1C depicts a side view of a fourth side of the one piece water permeable paver according to one or more embodiments.

FIG. 1D depicts a side view of a first side of the one piece water permeable paver according to one or more embodiments.

FIG. 1E depicts a side view of a third side of the one piece water permeable paver according to one or more embodiments.

FIG. 2 depicts a detail of an inner surface of a cell of the one piece water permeable paver according to one or more embodiment with a parking marker.

FIG. 3 depicts a detail of a locking tab according to one or more embodiments.

FIG. 4 depicts a detail of a flex joint according to one or more embodiments.

FIGS. 6A-6EE depict an interlocking traffic tile and a paver plate according one or more embodiments.

FIGS. 7A-7D depict the paver with at least one integral locking support according to one or more embodiments.

Figure 5:
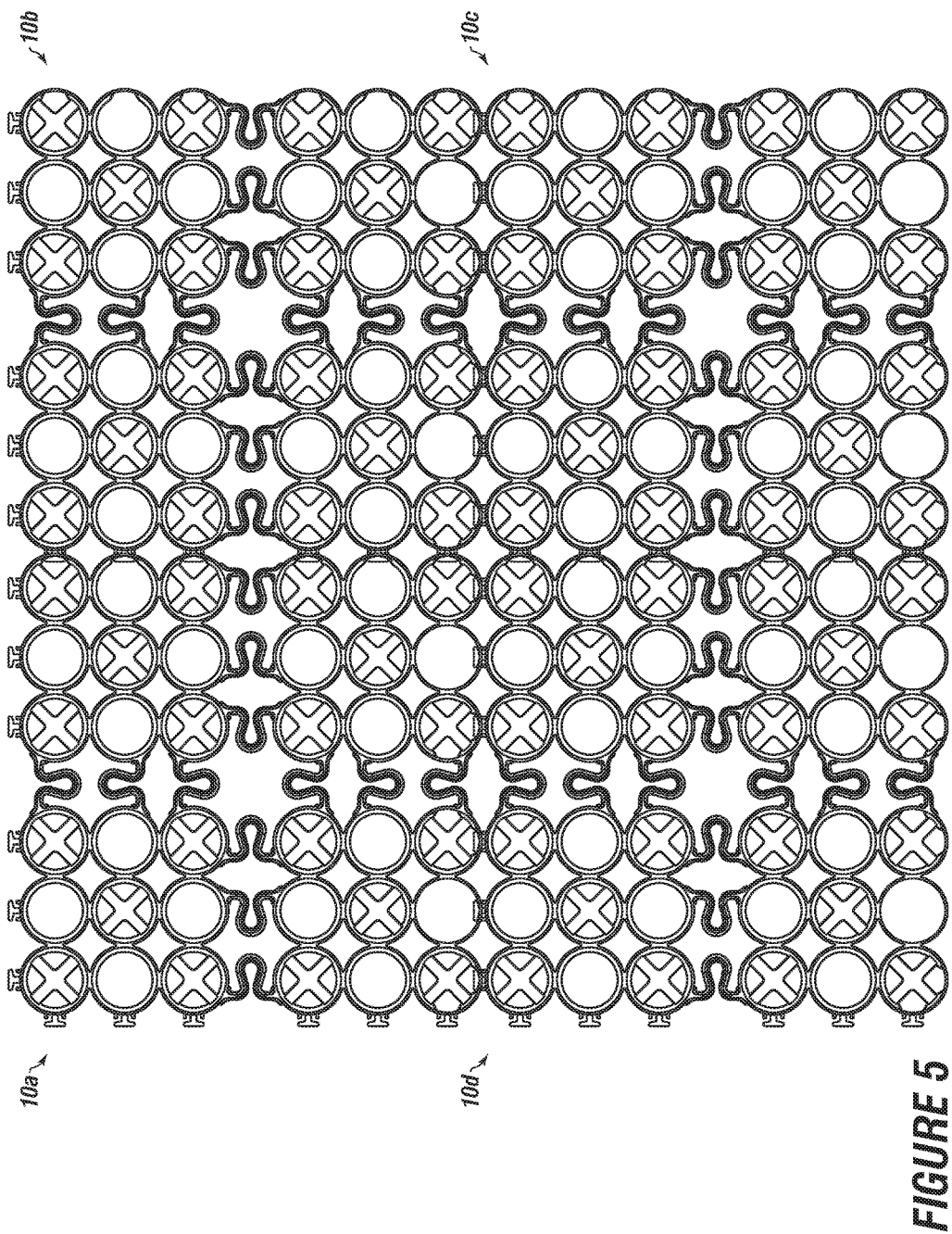
FIG. 5 depicts four interlocked one piece water permeable pavers according to one or more embodiments.
Figure 6A:
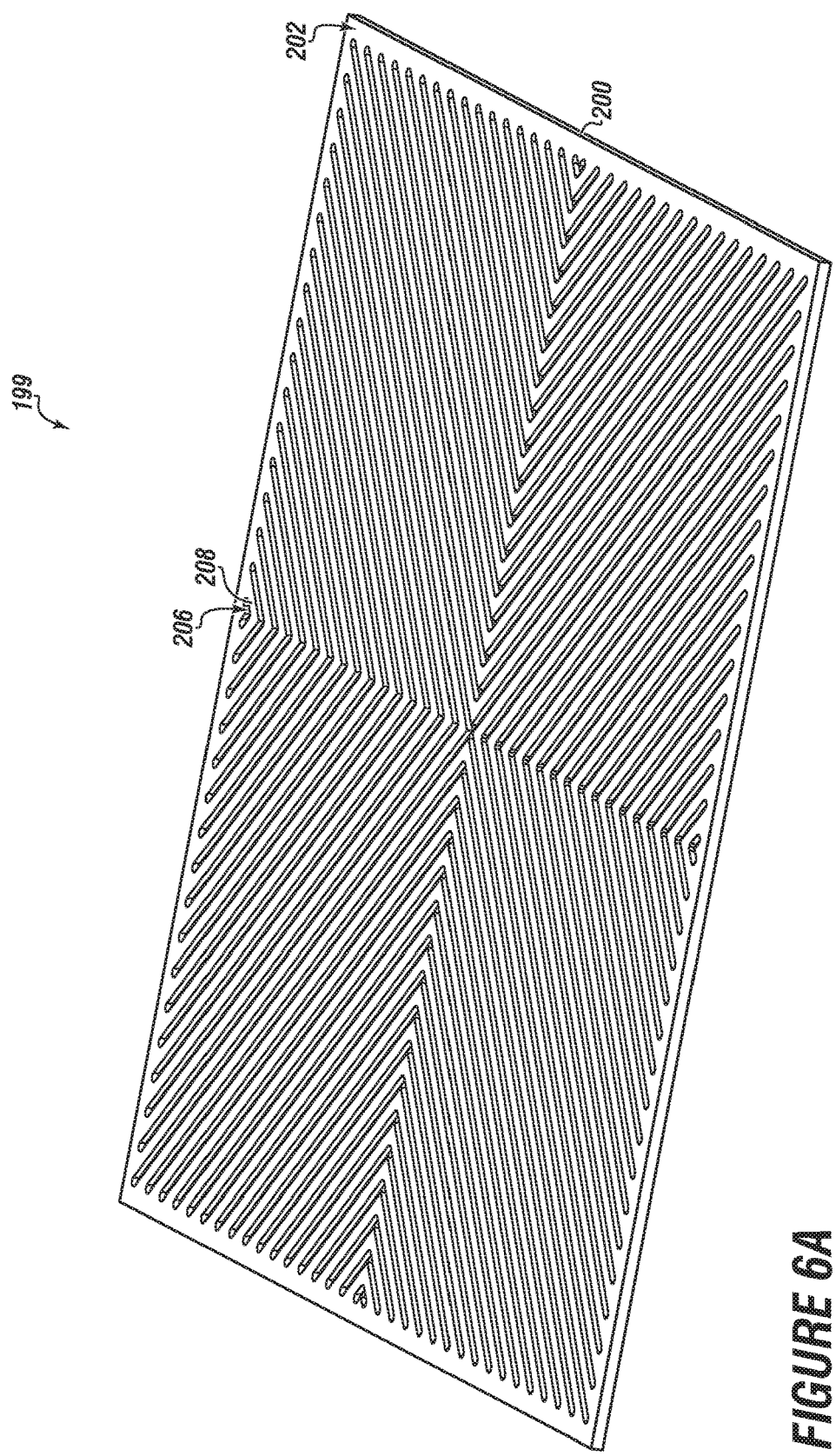
Figure 6B:
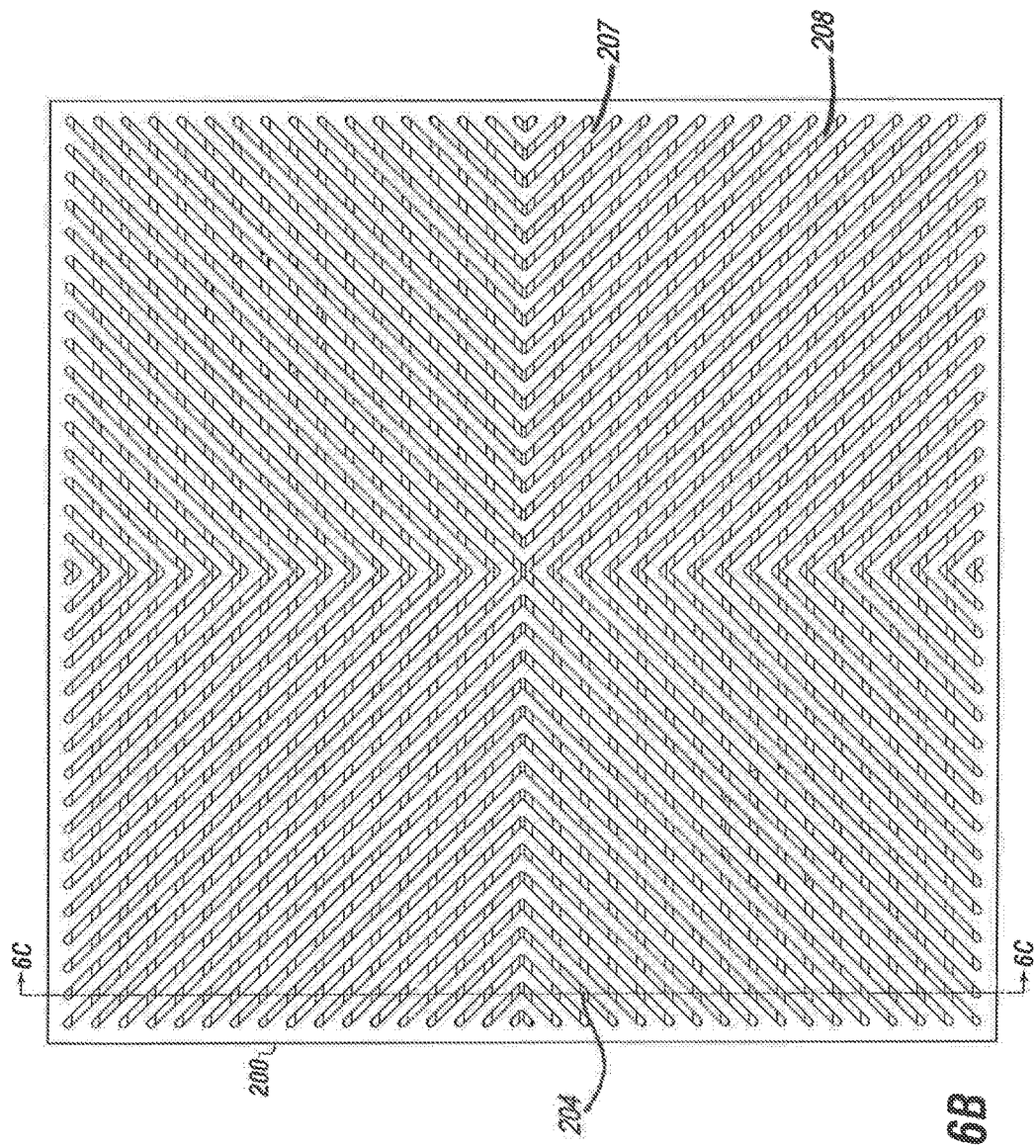

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments relate to a one piece water permeable paver for forming a surface suitable for traffic.

The embodiments relate to an interlocking traffic tile for a one piece water permeable paver configured to support traffic.

The interlocking traffic tile can be a molded plastic article that has a paver plate with a top side formed over a plurality of intersecting beams.

The top side can have at least one of: (i) a plurality of grooves extending into the top side of the paver plate with each groove having a plurality of perforations, (ii) a plurality of ribs extending through the top side of the paver plate with each rib having a plurality of perforations, and (iii) a plurality of perforations extending from the top side of the paver plate.

A plurality of integral interlocking supports can extend integrally from the plurality of intersecting beams for locking to a connection cell of the one piece water permeable paver.

In embodiments, each integral interlocking support can have a body and at least one flex leg projecting from the plurality of intersecting beams. In embodiments, each flex leg can be at least partially integral with the body.

In embodiments, each flex leg can have at least one locking foot extending from one of the flex legs. In embodiments, each locking foot can removably lock the paver plate to a connection cell of the one piece water permeable paver.

The one piece water permeable paver prevents flash flooding and thereby costly property damage and loss of life, by managing water flow and drainage in areas that otherwise present solid surfaces with little or no ability to absorb water.

The one piece water permeable paver helps improve the environment by enabling the removing of diesel, gasoline, oil and other pollutants from storm water through natural bioremediation before these pollutants enter a natural aquifer and poison shrinking water supplies which could lead to serious illness or death.

The one piece water permeable paver helps reduce rising temperatures from climate change and helps reduce environmental damage done to the planet due to the dramatic heating effects caused by the use of concrete and asphalt for traffic and parking surfaces.

The one piece water permeable paver improves the health of the planet by utilizing and recycling post-consumer and industrial waste that clog landfills. The one piece water permeable paver uses plastic trash, and recycles the plastic trash into a construction material usable to build parking lots, roadways, sidewalks and other traffic surfaces, including golf cart trails.

The one piece water permeable paver helps improve lifestyles for the handicapped or disabled persons as well as improve lifestyles for the elderly and children by enabling the construction of unobstructed and safe park trail ways. This one piece water permeable paver enables the construction of access ways to nature conservancies by providing inexpensive, natural grass and gravel ADA compliant walkways. The invention enables the construction of trails that are level and safe, preventing broken bones and other serious injuries and even death due to a fall.

The one piece water permeable paver prevents fire disasters by creating erosion resistant structures that include grass filled fire lanes so fire and emergency vehicles don't get stuck in the mud or prevented from reaching remote areas in a disaster as often happens in wildfire situations in California.

The one piece water permeable paver enables police and emergency responders to quickly install a roadway in a muddy area to quickly access a damaged area, where a permanent roadway was washed away.

The one piece water permeable paver provides roadways for occasional use by emergency vehicles and fire trucks in areas where the expense of a concrete roadway or asphalt roadway is prohibitive. The one piece water permeable paver enables the creation of inexpensive fire lanes, emergency lanes and maintenance vehicle lanes.

The embodiments relate to a one piece water permeable paver which can be interlocked together to create a system for soil stabilization. Soil stabilization can be achieved by connecting a plurality of one piece water permeable pavers together and filling the cells of the water permeable pavers with soil or aggregate.

The embodiments relate to a one piece water permeable paver for use with a storm water management system. Storm water management can be achieved by connecting together a plurality of one piece water permeable pavers and installing the connected one piece water permeable pavers adjacent a bayou or waterway.

The embodiments relate to a road formed from connected one piece water permeable pavers which have the cells are filled with aggregate.

The embodiments relate to a parking lot formed from connected one piece water permeable pavers with cells filled with dirt or grass or aggregate. In embodiments, the parking lot is an occasional use event parking lot or an industrial parking lot for staging of oil field drilling equipment.

The embodiments can include a marking plate for the one piece water permeable paver configured to support traffic.

The marking plate can have a marking plate tile with a marking plate top side formed over a plurality of intersecting beams.

In embodiments, a plurality of integral interlocking supports can integrally extend from the plurality of intersecting beams for locking to a connection cell of the one piece water permeable paver.

In embodiments, each integral interlocking support can have a body, at least one flex leg projecting from the plurality of intersecting beams with each flex leg at least partially integral with the body.

In embodiments, each integral interlocking support can have at least one locking foot extending from one of the flex legs. In embodiments, each locking foot can removably lock the marking plate to a connection cell of the one piece water permeable paver.

The term "cell" as used herein can refer to the cylindrical molded shapes which are connected to either other cells or to a flex joint to form the one piece water permeable paver. Cells can also be elliptical, rectangular, square or another polygon.

The term "inner flange" as used herein can refer to a sloped, triangular shaped structure when viewed in a side view that provides additional load support when each cell is filled with gravel, dirt, or aggregate. The inner flange specifically creates an increased surface area to prevent the one piece water permeable paver from being pushed into soil, keeping the paver level.

The term "parking marker" as used herein can refer to an insert, which can be plastic, and which provides a visual indicator creating parking zones or parking areas, and a plurality of the marking markers, used in a plurality of cells of the paver can create a parking series of dots, acting like a parking stripe. The plastic indicator can be non-deforming when driven over by a car.

Turning now to the Figures, FIG. 1A depicts a top view of a one piece water permeable paver according to one or more embodiments.

The one piece water permeable paver $10a$ can be made from a plurality of different types of cells connected to each other, to flex joints $24a$-$24l$, or to both.

The one piece water permeable paver can have a first side 12, a second side 14 opposite the first side 12, a third side 16 between the first side 12 and the second side 14, and a fourth side 18 between the first side 12 and the second side 14 opposite the third side 16.

The one piece water permeable paver $10a$ can have a plurality of outer flex joint connection cells $26a$-$26h$. Each outer flex joint connection cell can engage a flex joint from the plurality of flex joints $24a$-$24l$.

Each outer flex joint connection cell can have an outer flex joint connection cell outer surface $27a$-$27h$.

According to one or more embodiments, the one piece water permeable paver $10a$ can have a plurality of outer three connection cells $30a$-$30h$.

Each outer three connection cell $30a$-$30h$ can be connected to one of the outer flex joint connection cells $26a$-$26h$.

Each outer three connection cell can have an outer three connection cell outer surface $29a$-$29h$ respectively.

According to one or more embodiments, the one piece water permeable paver $10a$ can have a plurality of outer two connection cells $32a$-$32d$.

Each outer two connection cell $32a$-$32d$ can connect to two adjacent outer three connection cells $30a$-$30h$.

Each outer two connection cell can have an outer two connection cell outer surface $31a$-$31d$.

According to one or more embodiments, the one piece water permeable paver $10a$ can have a plurality of inner single flex joint connection cells $34a$-$34h$.

Each inner single flex joint connection cell $34a$-$34h$ can be connected to one of the flex joints $24a$-$24l$.

According to one or more embodiments, the one piece water permeable paver $10a$ can have a plurality of inner dual flex joint connection cells $36a$-$36d$.

Each inner dual joint connection cell can engage two flex joints simultaneously.

The one piece water permeable paver $10a$ can have a plurality of inner four connection cells $38a$-$38d$.

Each of the inner four connection cells $38a$-$38d$ can connect to a pair of outer three connection cells $30a$-$30h$ and to a pair of inner single flex joint connection cells $34a$-$34h$.

In embodiments, the one piece water permeable paver $10a$ can have an X-shaped anchor $62a$-$62h$ in each outer flex joint connection cell $26a$-$26h$.

In embodiments, the one piece water permeable paver $10a$ can have an X-shaped anchor $63a$-$63d$ in each inner dual flex joint connection cells $36a$-$36d$.

In embodiments, the one piece water permeable paver 10a can have X-shaped anchor 64a-64d in each of the outer two connection cells 32a-32d.

In embodiments, the one piece water permeable paver 10a can have an X-shaped anchor 65a-65d in each of the four connection inner cells 38a-38d.

Each cell can have a center point, such as outer two connection cell 32a having center point 83a.

In embodiments, the one piece water permeable paver can have the plurality of outer flex joint connection cells 26a-26h connecting adjacent cells at one of the clock positions: a 12 o'clock position, a 3 o'clock position, a 6 o'clock position and a 9 o'clock position.

In embodiments, the one piece water permeable paver can have the plurality of outer three connection cells 30a-30h connected to one adjacent outer flex joint connection cell 26a-26h, one adjacent outer two connection cell 32a-32d and one adjacent inner four connection cell 38a-38d at one of the clock positions: a 12 o'clock position, a 3 o'clock position, a 6 o'clock position and a 9 o'clock position.

In embodiments, the one piece water permeable paver can have the plurality of outer two connection cells 32a-32d connected to two adjacent outer three connection cells 30a-30h at one of the following clock positions on the outer surface of each cell: a 12 o'clock position, a 3 o'clock position, a 6 o'clock position and a 9 o'clock position.

In embodiments, the one piece water permeable paver can have the plurality of inner single flex joint connection cells 341-34h connected to a flex joint 24a-241 at a clock position on the outer surface of each inner single flex joint connection cell that is at one of the clock positions: a 12 o'clock position, a 3 o'clock position, a 6 o'clock position or a 9 o'clock position.

In embodiments, the one piece water permeable paver can have the plurality of inner dual flex joint connection cells 36a-36d connected to a flex joint 24a-241 on the outer surface of each inner dual flex joint connection cell at one of the clock positions: a 12 o'clock position, a 3 o'clock position, a 6 o'clock position and a 9 o'clock position.

In embodiments, the one piece water permeable paver can have the inner four connection cells 38a-38d connected to adjacent cells at a clock position on the outer surface of each cell at one of the clock positions: a 12 o'clock position, a 3 o'clock position, a 6 o'clock position and a 9 o'clock position.

According to one or more embodiments, the one piece water permeable paver 10a can have a plurality of locking tabs 42a-42f extending from outer surfaces of cells forming the third side 16 of the one piece water permeable paver.

The one piece water permeable paver 10a can have a plurality of locking tabs 42g-421 extending from outer surfaces of cells forming the first side 12 of the one piece water permeable paver.

Each cell can have an inner flange 60a. Inner flange 60a is depicted on an outer two connection cell 32a.

Each inner flange can extend toward the center point 83 of each cell. Each inner flange can extend from the bottom of the one piece water permeable paver.

FIG. 1B depicts a side view of the second side 14 of the one piece water permeable paver 10a according to one or more embodiments.

According to one or more embodiments, the one piece water permeable paver 10a can have a plurality of fastening slots 40a-40f formed partially through the cell outer surface of the cells of the second side 14.

In embodiments, the plurality of fastening slots 40a-40f can cut from the bottom 22 of the one piece water permeable paver 10a partially through the outer surface towards the top 20.

FIG. 1C depicts a side view of the fourth side 18 of the one piece water permeable paver according to one or more embodiments.

The one piece water permeable paver 10a can have a plurality of fastening slots 40g-401 formed partially through the cell outer surface of cells that create the fourth side 18 of the one piece water permeable paver 10a.

In embodiments, the plurality of fastening slots 40g-401 can be cut from the bottom 22 partially through the outer surface towards the top 20.

FIG. 1D depicts a side view of the first side 12 of the one piece water permeable paver according to one or more embodiments.

The plurality of locking tabs 42g-421 can be formed on the outer surface of the outer cells extending from the bottom 22, opposite the top 20, of the one piece water permeable paver 10a. Locking tab 42a is also shown.

FIG. 1E depicts a side view of the third side 16 of the one piece water permeable paver according to one or more embodiments.

The one piece water permeable paver 10a can have a plurality of locking tabs 42a-42f extending from each outer surface of cells extending from the bottom 22, opposite the top 20, of the one piece water permeable paver 10a. Locking tab 42g is also shown.

The locking tabs of a first one piece water permeable paver can interlock with the fastening slots of an adjacent one piece water permeable paver to create a roadway, trail, or similar traffic surface.

FIG. 2 depicts a detail of an inner surface of a cell of the one piece water permeable paver according to one or more embodiment with a parking marker.

In embodiments, a parking marker 44 can be insertable into one of the cells to provide parking guidance to users, such as marking edges of parking spaces. This use of a parking marker enables a user to avoid the need for painting dirt, aggregate, or similar surface materials An inner surface 45 of an outer three connection cell 30d is shown with a fastening slot 40d.

The fastening slot 40d can be tapered from the bottom of the cell towards the top.

In embodiments, each fastening slot 40a-401, shown here as 40d, can have an alignment opening 54 formed in the fastening slot for engaging a locking tab.

In embodiments, each fastening slot 40a-401, shown here as 40d, can have a tensioning rib 56 adjacent the fastening slot. In embodiments, a tensioning rib can be positioned on both sides of the fastening slot.

In embodiments, the tensioning ribs can be located on an external surface of the body of one or more integral interlocking supports.

FIG. 3 depicts a detail of a locking tab 42c according to one or more embodiments.

The locking tab 42c can have a shaft 48 with a shaft length 49 connected to the outer surface 27a of one of the outer flex joint connection cells 26a.

The locking tab 42c can have a head 50 connected to the shaft 48 at an angle 47. The angle 47 can be an angle from 80 degrees to 110 degrees from an axis of the shaft 48.

The locking tab 42c can have a head 50 with a head length 61. The head length 61 for the locking tabs can be larger than the shaft length 49.

The head 50 can have a load surface 51. The load surface 51 can have a slope that matches an inner surface curvature of a cell enabling the head to mate with a fastening slot.

A first sloped edge 52 can extend from the outer surface 27a of the outer flex joint connection cell 26a. The first sloped edge can be parallel with and spaced apart from the shaft 48 and also in a spaced apart relationship to the head 50.

An outer edge 63 of the first sloped edge 52 can have a curvature complimentary to the outer surface curvature of a cell with a fastening slot into which the head interlocks.

The outer length aspect of the first sloped edge 52 can have a width larger where the first sloped edge attaches to the outer surface 27a than the width at the outer edge 63. The first sloped edge can be tapered in embodiments.

A second sloped edge 53 can extend from the outer surface 27a of the outer flex joint connection cell 26a.

The second sloped edge 53 can be parallel with and spaced apart from the shaft 48 and can also be in a spaced apart relationship to the head 50.

The second sloped edge 53 can be opposite the first sloped edge 52.

An outer edge 55 of the second sloped edge 53 can have a curvature complimentary to the outer surface curvature of a cell with a fastening slot into which the head interlocks.

The outer length aspect of the second sloped edge 53 can have a width larger where the second sloped edge attaches to the outer surface 27a than the width at the outer edge 55. The second sloped edge can be tapered in embodiments.

FIG. 4 is a detail of a flex joint 24c according to one or more embodiments.

In embodiments, each flex joint can have a first arm 70, a body 71, and a second arm 72.

The body 71 can be twice as long as either the first arm or the second arm.

The first arm 70 can connect to outer flex joint connection cell 26a and the second arm 72 can connect to the outer flex joint connection cell 26b.

In embodiments, the body can be U shaped.

FIG. 5 depicts an assembly of a plurality of one piece water permeable pavers 10a-10d connected together according to one or more embodiments.

One piece water permeable paver 10a can be connected to one piece water permeable paver 10b using the locking tabs and fastening slots.

One piece water permeable paver 10a can be connected to one piece water permeable paver 10d using the locking tabs and fastening slots.

One piece water permeable paver 10b can be connected to one piece water permeable paver 10c using the locking tabs and fastening slots.

One piece water permeable paver 10c can be connected to one piece water permeable paver 10d using the locking tabs and fastening slots.

In embodiments, the one piece water permeable paver can be made from recycled plastics, such as milk bottles.

In embodiments, the one piece water permeable paver can be pigmented with soy based pigments to be environmentally friendly.

Installing the one piece water permeable pavers can be a simple six step process.

The process can include clearing and grading a ground surface, as the first step. This clearing and grading can be done by hand with a shovel for a small area or with a bulldozer for a large area.

The process can include laying and spreading ½ an inch to 8 inches of ½ inch to 1 and ½ inch diameter rock or gravel onto the cleared and graded ground, as the second step. This layer of rock or gravel can be compacted or compressed with a roller or compactor.

The process can include preassembling the one piece water permeable pavers into four interconnected pavers with the locking tabs interlocking into the slots, as the third step.

The process can include placing the preassembled one piece water permeable pavers over the compacted or compressed rock or gravel, as the fourth step.

The process can include dumping the aggregate into the cells of the one piece water permeable pavers, as the fifth step. From ¾ inch to 1 and ½ inch rock, recycled asphalt, or other aggregate can be used to evenly fill the cells.

The process can also include compacting the filled cells, forming a parking lot or traffic surface ready to use for 25 plus years without maintenance, as the sixth step.

A process to create a stabilized water permeable grass parking or traffic surface can include performing steps one, two, three and four as described above. After laying the pavers, the process can include filling the cells of the one piece water permeable pavers with soil instead of aggregate and installing seed or sod as desired.

Foot paths can also be created with the one piece water permeable pavers. Any size path can be made with the one piece water permeable pavers.

FIGS. 6A-6EE depict an interlocking traffic tile and a paver plate according one or more embodiments.

The interlocking traffic tile 199 can include at least one paver plate 200. In embodiments, the paver plate 200 can be an integral one piece molded paver plate, which can be made from polyethylene, polypropylene, or from another crystalline alpha olefin.

In embodiments, the paver plate 200 can be made from a composite, including graphite composite with high strength and flexibility.

The paver plate 200 can sustain temperatures from −58 degrees Fahrenheit to 194 degrees Fahrenheit without deforming. The paver plate 200 can have an impact resistance of from IZOD value of 2.0 ft/lbs pr greater. The paver plate 200 can be rectangular or square and have a thickness from 0.08 inches to 1.5 inches.

In embodiments, the paver plate can have identical dimensions to the one piece water permeable paver. In embodiments, the dimension can be less than the one piece water permeable paver.

In embodiments, the top side 202 can be formed over a plurality of intersecting beams 204a-204ag.

The plurality of intersecting beams 204a-204ag can be made from rectangular beams extending from 0.1 inch to 1 inch from the top side. In embodiments, from one to four beams per inch can be used.

The plurality of intersecting beams 204a-204ag can be formed at an angle to the plurality of grooves 206a-206e, the plurality of ribs 208a-208ag, or plurality of perforations 207a-207e. The angle can be from 30 degrees to 120 degrees, such as at a 90 degree angle, to the orientation of the grooves 206a-206e, ribs 208a-208ag or perforations 207a-207e.

A plurality of grooves 206a-206e can extend into the top side of the paver plate 200 with each groove having a plurality of perforations 207a-207d.

In embodiments, from one to four grooves per inch can be used and can extend from 0.01 inches to 0.5 inches into the paver plate The plurality of grooves can be parallel to each other. In embodiments, the grooves can be formed in an intersecting pattern or in a concentric circular pattern and have one perforation to twelve perforations 207a-207d per groove 206a-206e.

In embodiments, the grooves 206a-206e can be tapered.

A plurality of ribs 208a-208e can extend through the top side of the paver plate 200 with each rib 208a having a plurality of perforations 207a-207d.

Each rib 208a can extend from 0.01 inches to 0.5 inches from the paver plate.

In embodiments, from one to four ribs 208a-208e per inch can be used.

The plurality of ribs 208a-208e can be parallel to each other. In embodiments, the plurality of ribs 208a-208e can be formed in an intersecting pattern or in a concentric circular pattern.

In embodiments, 1 perforation to 12 perforations per rib 208a-208e can be used.

In embodiments, the plurality of ribs 208a-208e can be tapered.

A plurality of perforations 207a-207d can extend from the top side of the paver plate 200.

Each of the perforations can have a diameter ranging from 0.1 inches to 0.5 inches.

The perforations can be circular, elliptical or another shape.

In embodiments, the perforations can be tapered through the plate to prevent particulate from clogging the paver tile.

FIGS. 7A-7D depict the paver with at least one integral locking support according to one or more embodiments.

The interlocking traffic tile for the paver plate 200 with a top side 202 configured to support traffic, such as a car.

The paver plate can include at least one integral interlocking support 220a-220d extending from the plurality of intersecting beams 204a-204ag for locking to a connection cell of the one piece water permeable paver.

Each integral interlocking support can have a body 222 with an external surface 223. The body 222 can be a circular molded shape extending from the plurality of intersecting beams. The body can extend from 0.1 inches to 3 inches from the plurality of intersecting beams.

In embodiments, the body 222 can be a continuous wall 230 formed in a geometric shape. The geometric shape can be at least one of: a cylinder, a cube, and a pyramid.

The integral interlocking support can have at least one flex leg 224a-224b projecting from the plurality of intersecting beams 204a-204at. Each flex leg 224a-224b can be at least partially integral with the body 222.

The at least one integral interlocking support 220a-220d can have at least one locking foot 226a-226b extending from one of the flex legs 224a-224b. Each locking foot 226a-226b can removably lock the paver plate to a connection cell of the one piece water permeable paver.

Each integral interlocking support 220a-220d can have at least one flex leg 224a-224b projecting from the plurality of intersecting beams 204a-204b, each flex leg 224a-224b at least partially integral with the body 222.

In embodiments, the flex leg can project from 0.1 inches to 3 inches from the plurality of intersecting beams and can extend beyond the body.

In embodiments, the flex legs can be rectangular and extend from the plurality of intersecting beams. The flex leg can have a thickness from 0.06 inches to 0.25 inches.

The flex legs can be tapered to an end 236 as the flex leg extends from the plurality of intersecting beams 204a-204at. The taper can be from 1 degrees to 15 degrees per inch.

Each integral interlocking support can have at least one locking foot 226a extending from one of the flex legs 224, each locking foot removably locking the paver plate to a connection cell of the one piece water permeable paver.

In embodiments, the locking foot can be formed perpendicular to the flex leg and parallel to the paver plate.

In embodiments, a plurality of tensioning ribs 56a-56d can be formed on the external surface 223 of the body 222 of the at least one integral interlocking support 220a-220d. In embodiments from one to twelve tensioning ribs per body can be used.

In embodiments, the interlocking traffic tile for a paver plate can have the integral interlocking supports 220a-220d formed in the shape of a three dimensional letter. The three dimensional letter can have a face. The face can be secured to the plurality of intersecting beams 204a-204at.

A plurality of load transfer elements 234 can be contained in the body 222. Each load transfer element 234 can be in the shape of at least one of: an "X", a "+", a "#" symbol, an "H", an "I", a "W" and an "M" and a "Z".

In embodiments, each load transfer element can extend from the inside of a wall of the body to the opposite side of the wall of the body and provide torque resistance to the integral interlocking support.

The amount of load adapted for transfer by each load transfer element in a body can be from 100 pounds to 3000 pounds.

The load transfer element 234 can have a thickness from 0.08 inches to 0.3 inches.

At least one integral locating support 221a-221d can extend from the plurality of intersecting beams 204a-204at. The integral locating support can have a continuous wall 225a-225d with a geometric shape.

In embodiments, the geometric shape can include at least one of: a cylinder and a cube.

In embodiments, the integral locating support can be an "X", a "+", a "#" symbol, an "H", an "I", a "W" and an "M" and a "Z".

In embodiment, the integral locating support 221a-221d can have tensioning ribs 1000 formed on an external surface of the body.

Figure 8:
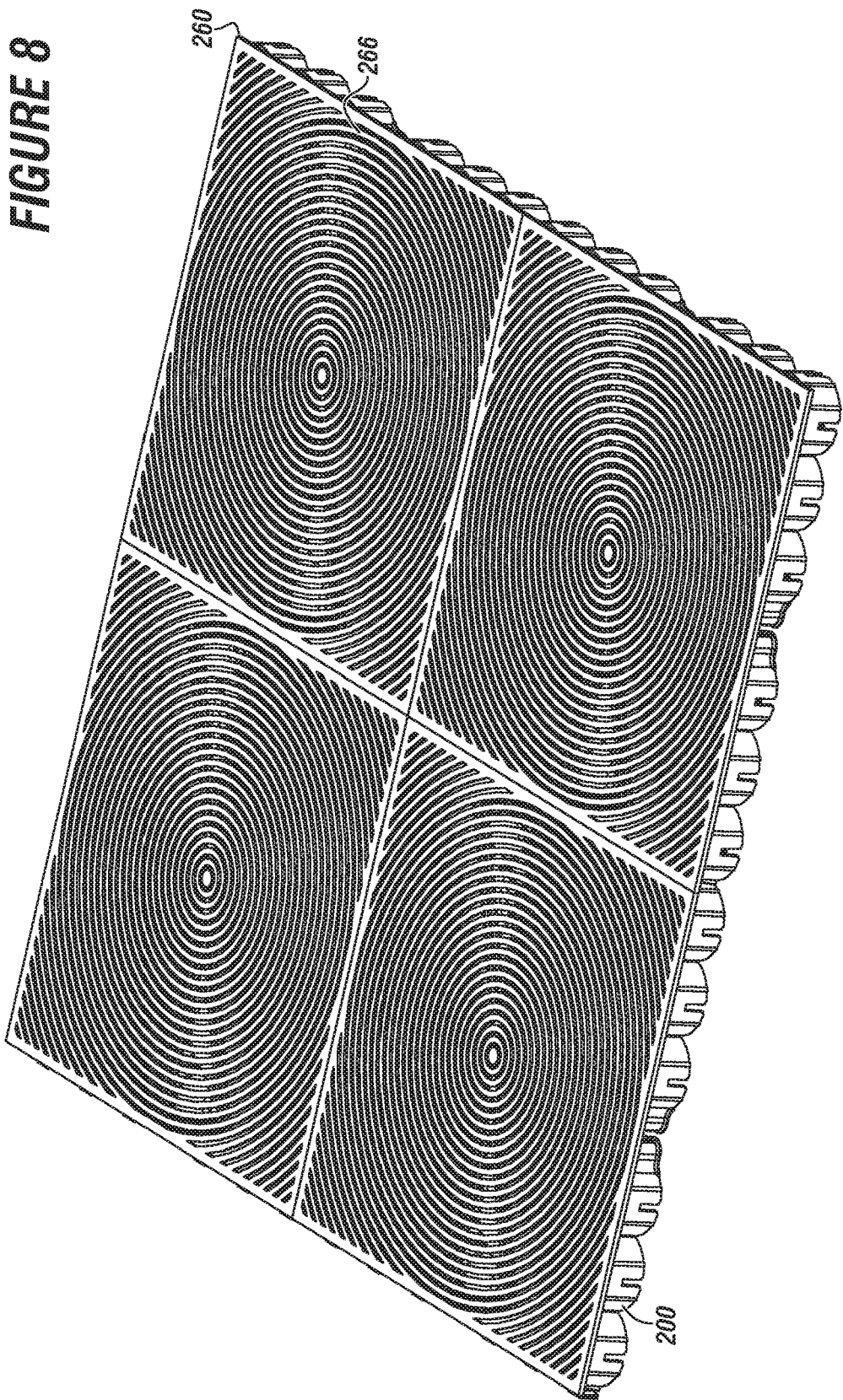
FIG. 8 depicts a plurality of connected one piece water permeable pavers according to one or more embodiments.

FIG. 8 depicts a plurality of connected one piece water permeable pavers according to one or more embodiments.

Each one piece permeable paver of the plurality of connected one piece water permeable pavers 260 can be covered with an interlocking traffic tile for the paver plate 200.

Each interlocking traffic tile can have at least one of: (i) the plurality of grooves extending into the top side of the paver plate with each groove having a plurality of perforations, (ii) a plurality of ribs extending through the top side of the paver plate with each rib of the plurality of ribs having a plurality of perforations, and (iii) a plurality of perforations extending from the top side of the paver plate. The plurality of grooves, the plurality of ribs, or the plurality of perforations extending from the top side of the paver plate can be in a plurality of concentric circles 266.

Figure 9:
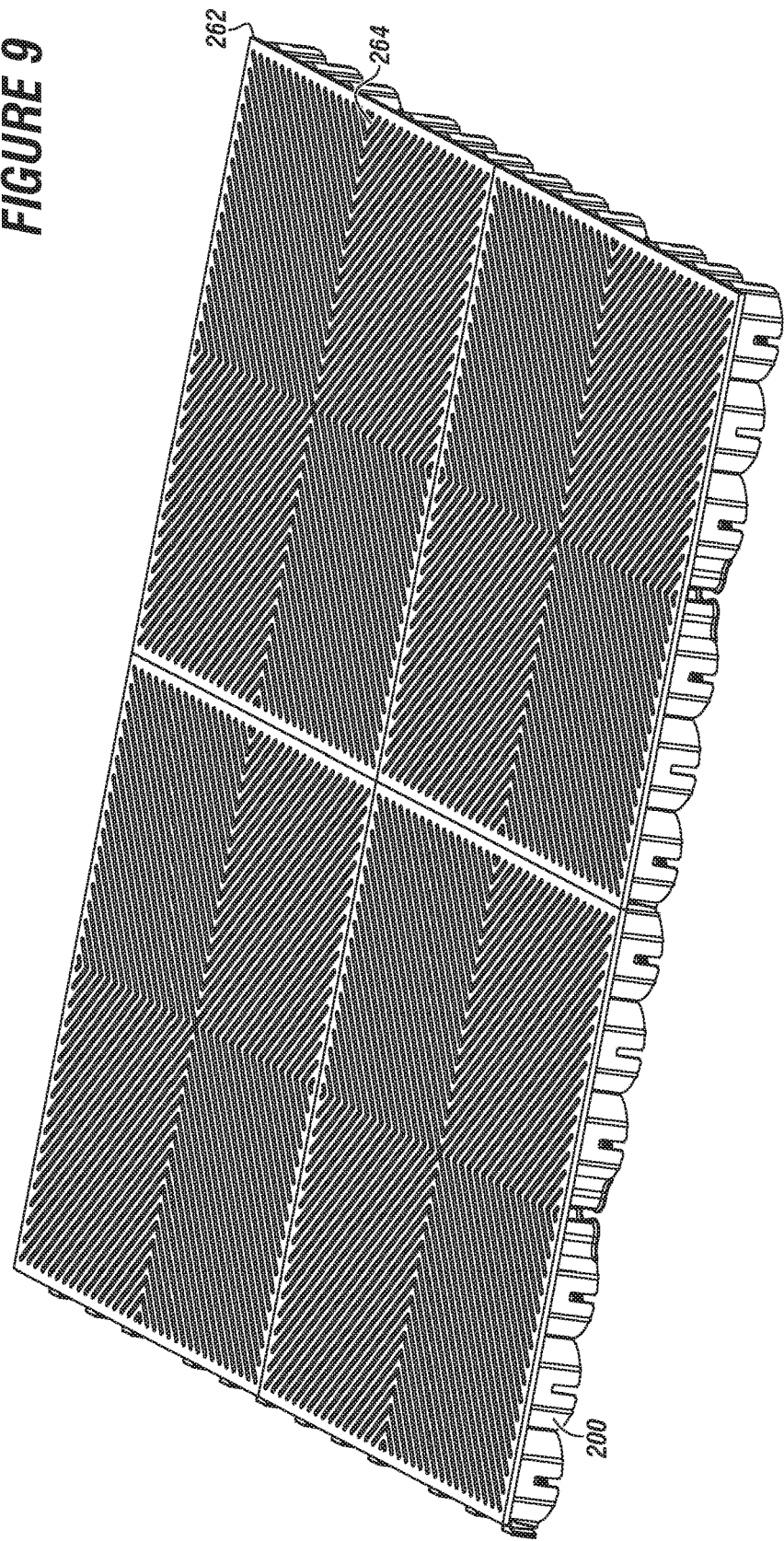
FIG. 9 depicts a plurality of connected one piece water permeable pavers according to one or more embodiments.

FIG. 9 depicts a plurality of connected one piece water permeable pavers according to one or more embodiments.

Each one piece permeable paver of the plurality of connected one piece water perable pavers 262 can be covered with an interlocking traffic tile of the paver plate 200. The plurality of grooves, the plurality of ribs, or the plurality of perforations extending from the top side of the paver plate can be in a plurality of triangular patterns 264.

Figure 10A:
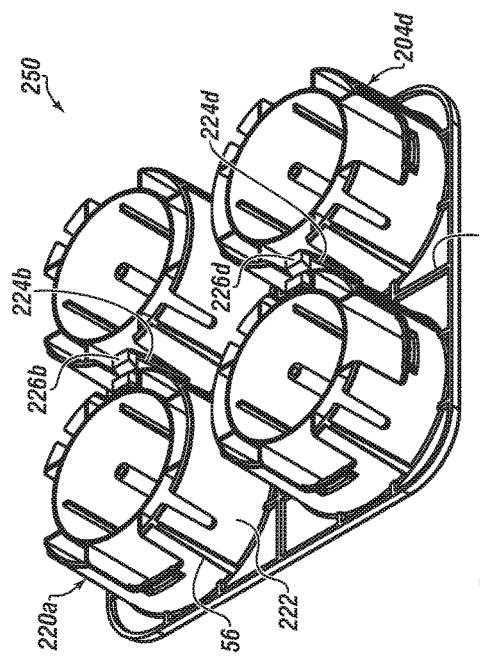
FIGS. 10A-10C depict interlocking marking traffic tiles according to one or more embodiments.
Figure 10B:
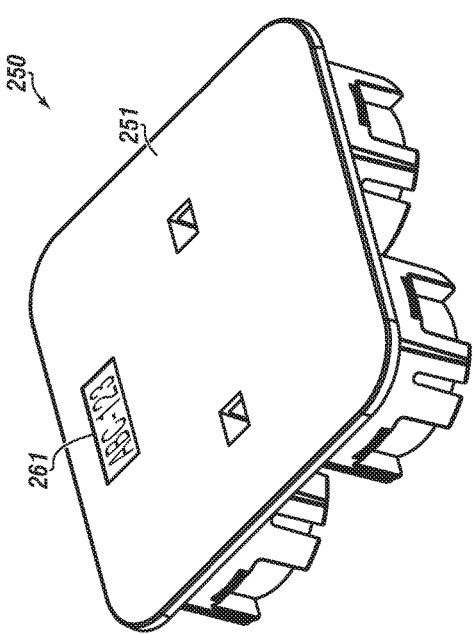
Figure 10C:
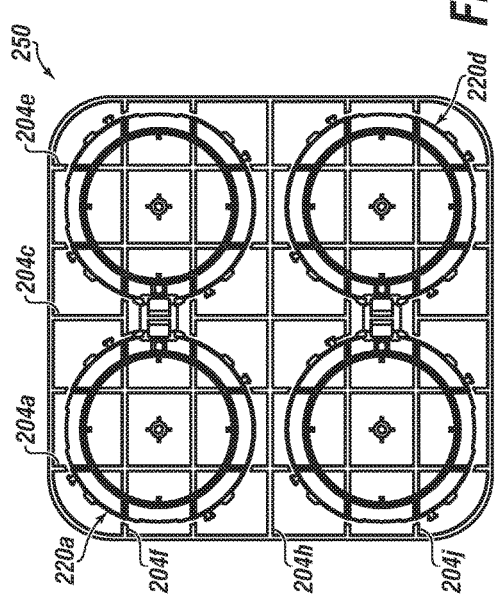

FIGS. 10A-10C depict interlocking marking traffic tiles according to one or more embodiments.

The interlocking marking traffic tiles 250 for a one piece water permeable paver can have a plurality of connection cells configured to support traffic.

The interlocking marking traffic tile 250 can have a marking plate tile 251 with a marking plate top side formed over a plurality of intersecting beams 204a-204j.

The marking plate 251 can be made from molded polyethylene, polypropylene or from crystalline alpha olefins.

In embodiments, the marking plate 251 can be made from a composite, including graphite composite with high strength and flexibility.

The marking plate 251 can sustain temperatures from −58 degrees Fahrenheit to 194 degrees Fahrenheit without deforming.

The marking plate 251 can have an impact resistance of from IZOD value of 2.0 ft/lbs or greater.

The marking plate 251 can have a thickness from 0.08 inches to 1.5 inches and can be rectangular or square in shape.

In embodiments, the marking plate 251 can have the identical dimensions of the one piece water permeable paver or have a dimension less than the one piece water permeable paver.

At least one integral interlocking support 220a-220d can extend from the plurality of intersecting beams 204a-204j for locking to a connection cell of the one piece water permeable paver. The at least one integral interlocking support 220a-220d can have a body 222, wherein the body 222 can connect the marking plate to the connection cell of the one piece water permeable paver.

In embodiments, the body 222 can have at least one flex leg 224b and 224d projecting from the plurality of intersecting beams 204a-204j. Each flex leg can be at least partially integral with the body 222.

In embodiments, at least one locking foot 226b and 226d can extend from one of the flex legs 224b and 224d. Each locking foot can be removable, locking the marking plate to a connection cell of the one piece water permeable paver.

In embodiments, a plurality of tensioning ribs 56 can be formed on an external surface of the body 222 of at least one of the integral interlocking supports 220a-220d.

In embodiments, the marking plate 250 can have a unique identifier 261. The unique identifier can be: a plurality of numbers, such as 22 indicating a parking space number, a plurality of number and letters, a plurality of numbers, letters, and symbols, or any unique code that can be used for identification.

The unique identifier can be a bar code, a QR code, or a series of symbols such as arrows pointing to an exit.

The unique identifier can project from the marking plate top side slightly in embodiments. In other embodiments the unique identifier can be flush with the marking plate top side.

In embodiments, the unique identifier can be embossed, laser etched, printed, imprinted or fastened into the marking plate top side.

In embodiments, an interlocking marking traffic tile 250 can cover the one piece water permeable pavers, or a plurality of permeable pavers.

While these embodiments have been described with emphasis on the embodiments, it should be understood that within the scope of the appended claims, the embodiments might be practiced other than as specifically described herein.

What is claimed is:

1. An interlocking traffic tile with a one piece water permeable paver comprising a plurality of connection cells and configured to support traffic, comprising:
   a. a paver plate comprising a top side formed over a plurality of intersecting beams; the top side comprising: at least one of: a plurality of grooves formed in the top side of the paver plate, a plurality of ribs formed in the top side of the paver plate with each rib of the plurality of ribs forming a plurality of perforations with the plurality of intersecting beams, and the plurality of perforations extending through the top side of the paver plate; and
   b. at least one integral interlocking support extending from the plurality of intersecting beams for locking to a connection cell of the one piece water permeable paver, the at least one integral interlocking support comprising a body, wherein the body connects the paver plate to the connection cell of the one piece water permeable paver, the connection cell of the one piece water permeable paver is selected from the group comprising: a plurality of outer three connection cells, a plurality of outer two connection cells, and outer flex joint connection cells, with spaces formed between connection cells, the connection cells and spaces configured to contain the fill material;
   with each water permeable paver comprising:
   (i) a first side, a second side, a third side, and a fourth side,
   (ii) a plurality of locking tabs extending from the first side and the third side of the connection cell;
   (iii) a plurality of fastening slots formed partially through the connection cells that form the second side and the fourth side of each one piece water permeable paver, wherein the plurality of locking tabs for each one piece water permeable paver engages the plurality of fastening slots, and
   wherein the interlocking traffic tile with the one piece water permeable paver is configured to support traffic.

2. The interlocking traffic tile with the one piece water permeable paver of claim 1, comprising at least one flex leg projecting from the plurality of intersecting beams, the at least one flex leg at least partially integral with the body, the at least one flex leg connecting the paver plate to the connection cell of the one piece water permeable paver and at least one locking foot extending from the at least one flex leg, wherein the at least one locking foot removably locking the paver plate to the connection cell of the one piece water permeable paver.

3. The interlocking traffic tile with the one piece water permeable paver of claim 1, wherein the at least one integral interlocking support comprises a continuous wall with a geometric shape.

4. The interlocking traffic tile with the one piece water permeable paver of claim 1, comprising at least one load transfer elements, the at least one load transfer element contained in the body of the at least one integral interlocking support, wherein the at least one load transfer element providing torque resistance to the at least one integral interlocking support.

5. The interlocking traffic tile with the one piece water permeable paver of claim 4, wherein the at least one load transfer element has the shape of at least one of: an "X", a "+" symbol, a "#" symbol, an "H", an "I", a "W" and an "M" and a "Z".

6. The interlocking traffic tile with the one piece water permeable paver of claim 2, wherein the at least one flex leg is rectangular and extends from the plurality of intersecting beams.

7. The interlocking traffic tile with the one piece water permeable paver of claim 2, wherein the at least one flex leg is tapered to an end as the at least one flex leg extends from the plurality of intersecting beams.

8. The interlocking traffic tile with the one piece water permeable paver of claim 1, comprising a plurality of tensioning ribs formed on an external surface of the body of the at least one integral interlocking support.

9. The interlocking traffic tile with the one piece water permeable paver of claim 1, wherein a plurality of connected one piece water permeable pavers are covered with an interlocking traffic tile.

10. The interlocking traffic tile with the one piece water permeable paver of claim 9, wherein each of the interlocking traffic tiles has at least one of: the plurality of grooves extending into the top side of the paver plate with each groove of the plurality of grooves having a plurality of perforations, a plurality of ribs extending through the top side of the paver plate with each rib of the plurality of ribs having a plurality of perforations, and a plurality of perforations extending from the top side of the paver plate in as at least one of: a plurality of triangular patterns and a plurality of concentric circles.

11. The interlocking traffic tile with the one piece water permeable paver of claim 1, comprising at least one integral locating support extending from the plurality of intersecting beams, wherein the integral locating support comprises a continuous wall with a geometric shape.

12. An interlocking marking traffic tile with a one piece water permeable paver comprising a plurality of connection cells configured to support traffic, comprising:
 a. a marking plate comprising a marking plate top side formed over a plurality of intersecting beams; each marker place comprising a plurality of perforations extending through the top side of the marking plate; and
 b. at least one integral interlocking support extending from the plurality of intersecting beams for locking to a connection cell of the one piece water permeable paver, the at least one integral interlocking support comprises a body, and wherein the body connects the marking plate to the connection cell of the one piece water permeable paver, the connection cell of the one piece water permeable paver is selected from the group comprising: a plurality of outer three connection cells, a plurality of outer two connection cells, and outer flex joint connection cells, with spaces formed between connection cells, the connection cells and spaces configured to contain the fill material;
 with each water permeable paver comprising:
 (i) a first side, a second side, a third side, and a fourth side,
 (ii) a plurality of locking tabs extending from the first side and the third side of the connection cell;
 (iii) a plurality of fastening slots formed partially through the connection cells that form the second side and the fourth side of each one piece water permeable paver, wherein the plurality of locking tabs for each one piece water permeable paver engages the plurality of fastening slots, and
 wherein the interlocking marking traffic tile with the one piece water permeable paver is configured to support traffic.

13. The interlocking marking traffic tile with the one piece water permeable paver of claim 12, comprising at least one flex leg projecting from the plurality of intersecting beams, the at least one flex leg at least partially integral with the body, and at least one locking foot extending from the at least one flex leg, the at least one locking foot removably locking the marking plate to the connection cell of the one piece water permeable paver.

14. The interlocking marking traffic tile with the one piece water permeable paver of claim 13, wherein the marking plate top side comprises a unique identifier, the unique identifier comprising at least one of: a plurality of numbers, a plurality of letters, a bar code, a QR code, and a series of symbols.

15. The interlocking marking traffic tile with the one piece water permeable paver of claim 14, wherein the unique identifier projects from the marking plate top side.

16. The interlocking marking traffic tile with the one piece water permeable paver of claim 15, wherein the unique identifier is either embossed, laser etched, printed, imprinted or fastened into the marking plate top side.

17. The interlocking marking traffic tile with the one piece water permeable paver of claim 14, comprising a plurality of tensioning ribs formed on an external surface of the body of the at least one integral interlocking support.

\* \* \* \* \*